United States Patent [19]

Stoller

[11] Patent Number: 4,895,439
[45] Date of Patent: Jan. 23, 1990

[54] ASPHERIC SPECTACLE LENS

[76] Inventor: Raymond Stoller, 5603 NW. 159th St., Hialeah, Fla. 33014

[21] Appl. No.: 218,647

[22] Filed: Jul. 13, 1988

[51] Int. Cl.$^4$ .............................. G02C 7/02; G02B 3/02
[52] U.S. Cl. ...................................... 351/167; 350/432
[58] Field of Search ................. 351/167, 159; 350/432, 350/433, 434, 435

[56] References Cited

U.S. PATENT DOCUMENTS

| 4,073,578 | 2/1978 | Welsh | 351/167 |
| 4,185,897 | 1/1980 | Frieder | 351/167 |
| 4,538,887 | 9/1985 | Bristol | 351/167 |

OTHER PUBLICATIONS

Renier, G. L.; "Aspheric Spectacles: Selecting Asphericity"; *Optometric Monthly;* Feb. 1978; pp. 110–113.

*Primary Examiner*—Scott J. Sugarman
*Attorney, Agent, or Firm*—Gifford, Groh, Sheridan, Sprinkle and Dolgorukov

[57] ABSTRACT

This patent discloses a spectacle lens having an aspheric front surface and a planar rear surface. The front surface of the spectacle lens includes a circular central zone and two or three annular zones surrounding the central zone. Each annular zone has an optical refraction of one diopter less than the adjacent interior optical zone of the spectacle lens.

3 Claims, 1 Drawing Sheet

ASPHERIC SPECTACLE LENS

BACKGROUND OF THE INVENTION

I. Field of the Invention

The present invention relates to spectacle lens and, more particularly, to an aspheric spectacle lens.

II. Description of the Prior Art

Previous known spectacle lens typically comprise an optic having a front convex surface and a rear concave surface. Both the convex and the concave surfaces are spherical.

Although these previously known spectacle lenses have proven satisfactory in operation, such lenses are relatively thick in construction. These thick spectacle lenses not only increase the overall weight of the lenses, but also create unsightly "power rings".

SUMMARY OF THE PRESENT INVENTION

The present invention provides a spectacle lens which overcomes all of the above mentioned disadvantages of the previously known spectacle lenses.

In brief, the spectacle lens of the present invention comprises a lens having an aspheric front surface and a planar rear surface. The front surface of the spectacle lens includes a circular central zone and two or three annular zones surrounding the central zone. Each annular zone has an optical refraction of one diopter less than the adjacent interior optical zone of the spectacle lens.

Since the front surface of the spectacle lens is aspheric, the spectacle lens of the present invention is thinner and more lightweight than the previously known spectacle lenses. Additionally, the spectacle lens of the present invention eliminates the "power rings" of the previously known spectacle lenses.

BRIEF DESCRIPTION OF THE DRAWING

The present invention will be better understood upon reference to the following detailed description, when read in conjunction with the accompanying drawing, wherein like reference characters refer to like parts throughout the several views, and in which: &

DETAILED DESCRIPTION OF PREFERRED EMBODIMENTS OF THE PRESENT INVENTION

Figure 1:
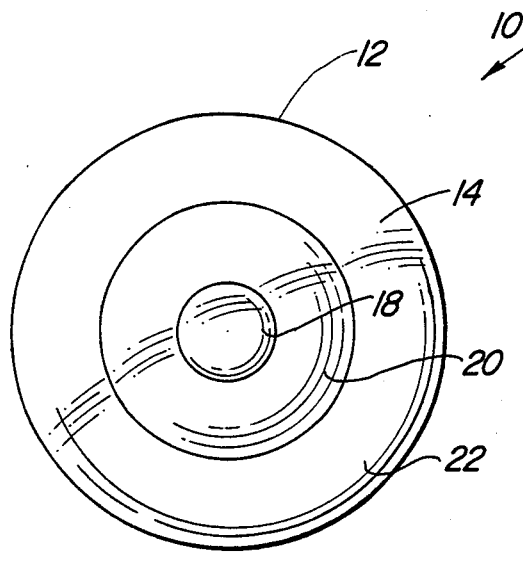
FIG. 1 is a front plan view illustrating a preferred embodiment of the present invention.
Figure 2:
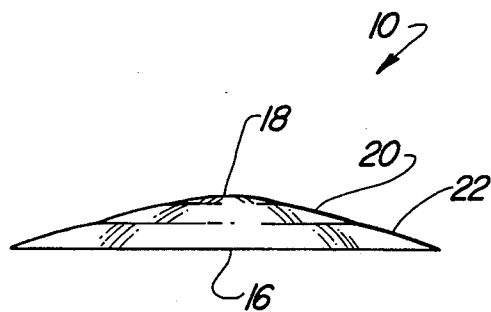
FIG. 2 is a bottom view of the embodiment shown in FIG. 1.
Figure 4:
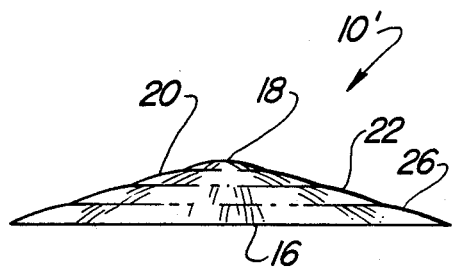
FIG. 4 is a bottom view of the embodiment shown in FIG. 3.

With reference first to FIGS. 1 and 2, a spectacle lens 10 of the preferred embodiment of the present invention is thereshown and comprises a generally circular optic 12. The optic 12 is constructed of any conventional material, such as glass or transparent plastic.

The optic 12 has a front surface 14 and a rear surface 16. The rear surface 16, best shown in FIG. 2, is generally planar in shape.

Unlike the rear surface 16, the front surface 14 has a central circular zone 18 having a predetermined optical refraction, such as four diopters. This central zone 18 is surrounded by two annular optical zones 20 and 22, each of which is substantially circular in shape.

The first or inner annular zone 20 has an optical refraction of one diopter less than the central zone 18. Similarly, the outer annular zone 22 has an optical refraction of one diopter less than the inner annular zone 20 so that the front surface 14 of the spectacle lens 10 is aspherical in shape.

Since the spectacle lens 10 of the present invention has an aspherical front surface and a planar rear surface, the overall spectacle lens is much thinner, in particular at the edges, in shape than conventional spectacle lenses. Furthermore, the spectacle lens of the present invention does not have the "power rings" common to the previously known spectacle lenses.

Figure 3:
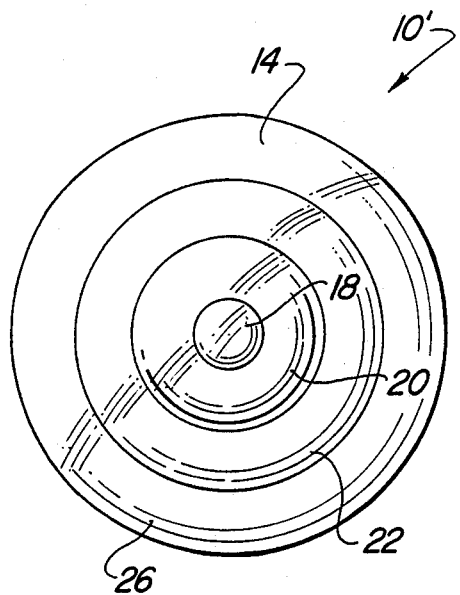
FIG. 3 is a view similar to FIG. 1, but illustrating a modification thereof.

With reference now to FIG. 3, a modification to the present invention is thereshown in which the spectacle lens 10' includes an additional outer annular optical zone 26. The third annular optical zone 26 is positioned around and circumscribes the second annular zone 22. The third optical zone 26 has a refraction one diopter less than the optical zone 22 and, as before, the rear surface 16 of the spectacle lens 10' is planar.

From the foregoing, it can be seen that the annular optical zones of the spectacle lens decrease by one diopter from the central zone and for each annular zone. This construction provides a thin and lightweight spectacle lens as well as a lens without objectionable "power rings". Furthermore, the present invention accomplishes this without any sacrifice of the optical characteristics of the spectacle lens.

Having described my invention, many modifications thereto will become apparent to those skilled in the art to which it pertains without deviation from the spirit of the invention as defined by the scope of the appended claims.

I claim:

1. A spectacle lens consisting of:
    a substantially circular optic having an aspheric front surface and a rear surface,
    said front surface of said optic having a central optical zone and between two and three annular optical zones surrounding said central zone,
    wherein said central zone has a predetermined diopter refraction,
    wherein each annular optical zone has a predetermined diopter refraction which is substantially one doopter less than the diopter refraction of the optical zone immediately adjacent its interior, and
    wherein said rear surface is substantially planar.

2. The invention as defined in claim 1 wherein said central zone is circular in shape.

3. The invention as defined in claim 2 wherein said annular zones are circular in shape.

* * * * *